United States Patent [19]  [11] 3,855,192
Rodger  [45] Dec. 17, 1974

[54] INHIBITING PREMATURE VULCANIZATION OF W-TYPE POLYCHLOROPRENE RUBBER WITH N-HYDROCARBYL-THIOIMIDES

[75] Inventor: Edward Raymond Rodger, Akron, Ohio

[73] Assignee: Monsanto Chemicals Limited, London, England

[22] Filed: Oct. 12, 1972

[21] Appl. No.: 299,875

Related U.S. Application Data

[63] Continuation-in-part of Ser. No. 150,830, June 7, 1971 abandoned.

[30] Foreign Application Priority Data
Oct. 26, 1971  Great Britain ............... 49699/71

[52] U.S. Cl. ........ 260/92.3, 260/23.7, 260/33.6 AQ, 260/79.5 B, 260/780, 260/794
[51] Int. Cl. ...... C08d 9/14, C08c 11/06, C08c 11/54
[58] Field of Search ............. 260/92.3, 79.5 B, 794, 260/780

[56] References Cited
UNITED STATES PATENTS
3,546,185  12/1970  Corran et al. ............. 260/780

FOREIGN PATENTS OR APPLICATIONS
809,316  2/1959  Great Britain ............... 260/794
909,268  10/1962  Great Britain ............... 260/92.3

Primary Examiner—Joseph L. Schofer
Assistant Examiner—Herbert J. Lilling

[57] ABSTRACT

The premature vulcanization of polychloroprene rubber composition containing a metal oxide vulcanizing agent and a thiourea vulcanization accelerator of the formula

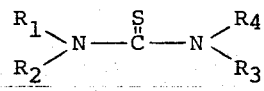

in which (a) each of $R_1$ and $R_4$ independently is a hydrogen atom or a substituted or unsubstituted hydrocarbon group and each of $R_2$ and $R_3$ is a substituted or unsubstituted hydrocarbon group, (b) $R_1$ and $R_2$ together with the nitrogen atom to which they are attached form a saturated cyclic group and $R_3$ and $R_4$ are the same as before, or (c) $R_1$ and $R_2$ together with the nitrogen atom to which they are attached form a saturated cyclic group and $R_3$ and $R_4$ together with the nitrogen atom to which they are attached form a saturated cyclic group, is inhibited by incorporation of an N-(thio)substituted carboxylic imide.

23 Claims, No Drawings

INHIBITING PREMATURE VULCANIZATION OF W-TYPE POLYCHLOROPRENE RUBBER WITH N-HYDROCARBYL-THIOIMIDES

BACKGROUND OF THE INVENTION

This application is a continuation-in-part application of application Ser. No. 150,830 filed June 7, 1971, and now abandoned.

This invention relates to a process for the vulcanization of polychloroprene rubber, more particularly to the use in such a process of an additive which has the effect of inhibiting prevulcanization of the rubber.

In the manufacture of vulcanized rubber products, crude rubber is combined with various other ingredients such as fillers, accelerators, and antidegradants to alter and improve processing of the rubber and to improve the properties of the final product.

The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. premature vulcanization is a major problem in the rubber industry and must be prevented in order to allow the rubber mix to be preformed and shaped before it is cured or vulcanized.

Moreover different rubbers show the tendency to different degrees, and the use of additives or processing conditions which reduce or eliminate the problem for one type of rubber cannot be expected to be applicable to different types of rubber.

Most of the studies on prevulcanization inhibition have been carried out on sulfur-vulcanizable hydrocarbon rubbers, since such rubbers are, in terms of volume of production, the most important. Polychloroprenes differ greatly from other synthetic rubbers and natural rubber in the manner in which they can be vulcanized. For example, the preferred vulcanizing agents for polychloroprenes are certain metal oxides such as zinc oxide or magnesium oxide, whereas such oxides have no effect as vulcanizing agents in hydrocarbon rubbers. There are, moreover, different types of polychloroprene rubber. The so-called G-types of polychloroprene are made by polymerization of chloroprene in the presence of sulfur, and contain a thiuram disulfide as stabilizer, while the W-types contain no sulfur or thiuram disulfide and are made using one example alkyl mercaptans as chain transfer agents or modifiers. There are many differences in the physical and vulcanization characteristics of the two types.

The problem of prevulcanization is particularly acute with W-type polychloroprenes, especially mercaptan modified poly-chloroprene, and it is with a method of improving the processing safety of rubber mixes based on W-type polychloroprene that the present invention is particularly concerned.

SUMMARY OF THE INVENTION

In one aspect, the invention concerns a process for the vulcanization of a W-type polychloroprene, which comprises incorporating into the unvulcanized rubber a metal oxide vulcanizing agent, a vulcanization accelerator which is a thiourea derivative having the formula

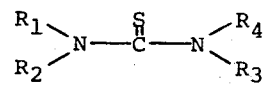

where (a) each of $R_1$ and $R_4$ independently is a hydrogen atom or a substituted or unsubstituted hydrocarbon group and each of $R_2$ and $R_3$ is a substituted or unsubstituted hydrocarbon group, (b) $R_1$ and $R_2$ together with the nitrogen atom to which they are attached form a saturated cyclic group and $R_3$ and $R_4$ are the same as before, or (c) $R_1$ and $R_2$ together with the nitrogen atom to which they are attached form a saturated cyclic group and $R_3$ and $R_4$ together with the nitrogen atom to which they are attached form a saturated cyclic group, and as prevulcanization inhibitor, and N-substituted carboxylic imide in which the N-substituent is a group —S—R where R is a hydrocarbon or substituted hydrocarbon group, and heating the mixture at a vulcanization temperature.

In another aspect, the invention relates to a process for inhibiting the prevulcanization of W-type polychloroprene rubber composition that is to be vulcanized using a metal oxide vulcanizing agent and a vulcanization accelerator that is a thiourea derivative as defined above, which comprises incorporating into the unvulcanized rubber, in addition to the vulcanizing agent and the vulcanization accelerator, an N-substituted carboxylic imide in which the N-substituent is a group —S—R where R is a hydrocarbon or substituted hydrocarbon group.

The invention also includes a vulcanizable composition comprising a W-type polychloroprene, a metal oxide that is a vulcanizing agent for the polychloroprene, a thiourea derivative as defined above and an N-substituted carboxylic imide in which the N-substituent is a group —S—R where R is a hydrocarbon or substituted hydrocarbon group.

The preferred metal oxide vulcanizing agents are magnesium oxide and zinc oxide, the preferred vulcanization accelerators are the trialkylthioureas and the tetraalkylthioureas, and the prevulcanization inhibitors are typically N-alkylthio, N-cycloalkylthio, N-aralkylthio and N-arylthio derivatives of male-imide, succinimide and phthalimide.

In certain applications, an additional benefit, in terms of increased processing safety or improved vulcanizate properties, is obtained by including in the rubber mix a thiazole sulfenamide, in particular an N-substituted benzothiazole-2-sulfenamide, for example N-cyclohexyl-benzothiazole-2-sulfenamide, N-t-butylbenzothiazole-2-sulfenamide, or 2-mor-pholinothiobenzothiazole.

With reference to the vulcanization accelerator used in the present process, the hydrocarbon groups from which $R_1$, $R_2$, $R_3$ and $R_4$ in the formula of the substituted thiourea can be selected include alkyl and alkenyl groups, which may for example contain from 1 to 20 carbon atoms and have straight or branched chains, for instance methyl, ethyl, n-propyl, isopropyl, the various isomeric butyl, amyl and hexyl groups, 2-ethylhexyl, normal decyl, dodecyl and octadecyl, allyl, methallyl and oleyl groups; cycloalkyl and alkylcycloalkyl groups, usually containing 5 or 6 ring carbon atoms and a total of not more than 10 carbon atoms, for instance cyclopentyl, cyclohexyl, methylcylohexyl and dimethylcyclohexyl groups; and aralkyl groups containing from 7 to 10 carbon atoms, for instance benzyl, 4-methyl-benzyl and α-methylbenzyl groups. Examples of substituted hydrocarbon groups are halogen- or cyano-substituted alkyl groups, for example β-chloroethyl and β-cyanoethyl groups.

Where either $R_1$ and $R_2$ or $R_3$ and $R_4$ form a saturated cyclic group with the nitrogen atom, such a group usually contains 5, 6, or 7 ring atoms, one of which may optionally be an oxygen or sulfur atom, and a total of not more than 10 carbon atoms. Examples are pyrrolidino, piperidino, morpholino, 2,6-dimethylmorpholino, thiomorpholino and hexamethyleneimino groups.

Examples of substituted thioureas that can be used as accelerators in the vulcanization of polychloroprene rubbers according to the process of the invention are N,N'-diisopropylthiourea; N,N'-di-n-butylthiourea; N,N'-di-n-hexylthiourea; trimethylthiourea; N,N'-dimethyl-N'-isopropylthiourea; N,N'-dimethyl-N'-cyclohexylthiourea; N,N,N'-triethylthiourea; N,N-diethyl-N'-n-butylthiourea; N,N-diethyl-N'-t-butylthiourea; N,N-diethyl-N-cyclohexylthiourea; N,N-diisopropyl-N'-allylthiourea; triisopropylthiourea; N,-N-diisopropyl-N'-n-butylthiourea; N,N-di-n-butyl-N'-isopropylthiourea; N,N,N'-tri-n-butyl-thiourea; N,N-di-n-butyl-N'-t-butylthiourea; N,N-di-n-butyl-N'-cyclohexylthiourea; N,N-diisobutyl-N-ethylthiourea; N,N-dicyclohexyl-N'-ethylthiourea; tricyclohexylthiourea, N,N-tetramethylene-N'-benzylthiourea; N,N-pentamethylene-N'-n-butylthio-urea; N-morpholino-N'-methylthiourea; N-morpholino-N'-n-butyl-thiourea; and N-morpholino-N'-cyclohexylthiourea.

Still other examples of substituted thioureas that are suitable as accelerators in the vulcanization of polychloroprene rubbers according to the process of the invention are N,N,N', N'-tetramethylthiourea; N,N-N',N'-tetraethylthiourea; N,N-dimethyl-N',N'-diisopropylthiourea; N,N'-dimethyl-N,N'-dicyclohexylthiourea; N,N-diethyl-N', N'-di-n-butylthiourea; N,N-diisopropyl-N'-, N'-diallylthiourea; tetraisopropylthiourea; N,N,N', N'-tetra-n-butylthiourea; N,N-dimethyl-N'N'-tetramethylenethiourea; N,N,N', N'-di-pentamethylenethiourea; N,N-dimethyl-N'-morpholino-thiourea; N-morpholino-N', N'-di-n-butylthiourea; and N-morpholino-N'-cyclohexyl-N'-methylthiourea.

Among the most effective accelerators are substituted thioureas where each of $R_1 R_2$, and $R_3$ in the above formula is an alkyl group containing 3,4 or 5 carbon atoms, for example N,N,N'-tri-n-butylthiourea or where each of $R_1$, $R_2$, $R_3$ and $R_4$ in the above formula is an alkyl group containing from 1 to 5 carbon atoms, for example N,N,N',N'-tetramethylthiourea and N,N,-N',N'-tetra-n-butylthiourea.

As indicated above, the prevulcanization inhibitors used in the process of the invention can be for example N-substituted derivatives of maleic acid, succinic acid, and phthalic acid. Also suitable are the N-substituted derivatives of the corresponding C-substituted acids, for example alkyl, alkoxy or halogen-substituted acids, as well as N-substituted imides of acids such as naphthalic acid, cyclohexene-1,2-dicarboxylic acid and pyromellitic acid.

Effective inhibitors are N-substituted carboxylic imides where R of —S—R is alkyl of 1 to 20 carbon atoms, cyclo-alkyl of 5 to 12 carbom atoms in the ring, and aryl of 6 to 10 carbon atoms. The term alkyl includes radicals substituted in the carbon chain, as for example, aryl, alkoxy, nitro, chloro, bromo, fluoro, iodo and hydroxy. The term aryl includes radicals substituted in the carbocyclic nucleus, for example, by alkyl, alkoxy, nitro, chloro, bromo, fluoro, iodo, and hydroxy. Examples of inhibitors suitable for the practice of this invention are the inhibitors described in U.S. Pat. No. 3,546,185 which disclosure is incorporated herein by reference.

Examples of N-substituted carboxylic imides that can be used in the process of the invention are N-(cyclohexylthio)-phthalimide, N-(benzylthio)phthalimide, N-(ethylthio)phthalimide, N-(isopropylthio)phthalimide, N-(isobutylthio)phthalimide, N-(n-heptylthio)phthalimide, N-(naphthylthio)phthalimide, N-(cyclohexylthio)maleimide, N-(phenylthio)maleimide, N-p-chloro-phenylthio)maleimide, N-(p-tolylthio)maleimide, N-(p-nitro-phenylthio)maleimide, N-(benzylthio)maleimide, N-(t-butylthio)-maleimide, N-(n-dodecylthio)maleimide, N-(cyclohexylthio)-4-cyclohexene-1,2,-dicarboximide, N-(isopropylthio)-4-cyclohexene-1,2-dicarboximide, N-phenylthio-3,4,5,6-tetrachloro-phthalimide, N-n-butylthio-3,4,5,6-tetrachlorophthalimide, N-cyclohexylthio-3,4,5,6-tetrachlorophthalimide, N-cyclohexylthio-naphthalimide, N,N'-bis(p-tolylthio)-1,2,4,5-benzene-tetracarboxylic-1,2:4,5-diimide, N-(o-tolylthio)succinimide, N-(t-butylthio)succinimide, N-(naphthylthio)phthalimide, N-(isopropylthio)succinimide and N-(cyclohexylthio)succinimide.

The quantity of prevulcanization inhibitor used in the process of the invention can vary, depending for example on the particular formulation and the degree of processing safety required, but will normally be from 0.1 to 5 parts by weight per 100 parts by weight of polychloroprene polymer. For many applications, the optimum is within the range 0.2 to 1 part by weight per 100 parts by weight of polymer.

The manner of carrying out the process of the invention, with regard, for example, to the incorporation of the accelerator and vulcanizing agent, and the temperature and duration of heating to effect vulcanization, is essentially the same as used hitherto for the vulcanization of polychloroprene rubbers. Thus, a conventional amount of metal oxide vulcanizing agent can be used, for example from 5 to 12 parts by weight per 100 parts by weight of rubber. The quantity of accelerator used can vary, depending for example on the particular formulation and the physical properties required to the vulcanizate, but will normally be from 1 to 5 parts by weight per 100 parts by weight of polychloroprene polymer. For many applications, the optimum is from 1.5 to 3 parts by weight per 100 parts by weight of polymer. Moreover, polychloroprene compositions that are vulcanized according to the process of the invention can contain other conventional additives such as for instance fillers, processing aids, and antioxidants.

DESCRIPTION OF PREFERRED EMBODIMENTS

The invention is illustrated by the following Examples.

The base formulations used had the following compositions:

| Ingredients | Parts by Weight | |
|---|---|---|
| | Formulation I | Formulation II |
| Polychloroprene (WRT)* | 100 | 100 |
| SRF black | 100 | 20 |
| Whiting | — | 40 |
| Linseed oil | — | 10 |
| Hydrocarbon Processing Oil | 20 | — |
| Magnesium oxide | 4 | 4 |
| Zinc oxide | 5 | 5 |
| Stearic acid | 1 | 1 |
| Factice | — | 15 |

* A crystallization-resistant polychloroprene W

Portions of the base formulations were mixed with the accelerator alone (for comparative results) or with the accelerator and the prevulcanization inhibitor, in the amounts shown in the table below. The figures indicate parts by weight per 100 parts by weight of polychloroprene.

Processing safety was assessed using a Mooney Plastometer operating at 121°C. (see British Standard 1673). The time for the reading of the instrument to reach 5 units above the minimum viscosity ($t_5$) was taken as the scorch time of the stock, and is a measure of the processing safety of the stock, that is to say the period during which there is freedom of scorch and satisfactory flow during the initial stages of a molding process.

EXAMPLE I

| | Base Formulation I | | Base Formulation II | |
|---|---|---|---|---|
| Tri-n-butyl thiourea | 2.0 | 2.0 | 2.0 | 2.0 |
| N-(Cyclohexylthio) phthalimide | — | 0.5 | — | 0.5 |
| Processing safety (minutes) | 20.5 | 32.8 | 16 | 27.8 |

EXAMPLE II

| | Base Formulation I | | |
|---|---|---|---|
| Tetramethylthiourea | 1.0 | 1.0 | 1.0 |
| N-Cyclohexylthio)phthalimide | — | 0.5 | 1.0 |
| Processing safety (Minutes) | 6.1 | 9.9 | 12.9 |

These results show the marked increase in the processing safety of the rubber mix when the prevulcanization inhibitor N-(cyclohexylthio)phthalimide is present.

Similar, although not identical, results showing improved processing safety of polychloroprene compositions are obtained when using other inhibitors of the invention. Additional examples are omitted since they would only extend the specification without contributing to better understanding of the invention.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for inhibiting the prevulcanization of a W-type polychloroprene rubber composition comprising vulcanizing agent consisting of a metal oxide and a vulcanization accelerator which is a thiourea derivative having the formula

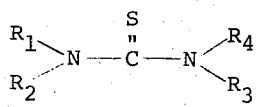

where (a) each of $R_1$ and $R_4$ independently is a hydrogen atom or is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, and each of $R_2$ and $R_3$ is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, or (b) $R_1$ and R together with the nitrogen atom to which they are attached form a saturated cyclic group of 4 to 10 carbon atoms and $R_3$ and $R_4$ are the same as before, or (c) $R_1$ and $R_2$ together with the nitrogen atom to which they are attached form a saturated cyclic group of 4 to 10 carbon atoms and $R_3$ and $R_4$ together with the nitrogen atom which they are attached form a saturated cyclic group of 4 to 10 carbon atoms, which comprises incorporating into the unvulcanized rubber, in addition to the vulcanizing agent and the vulcanization accelerator, an N-substituted carboxylic imide in which the N-substituent is a group-S—R where R is alkyl of 1 to 20 carbon atoms, aryl of 6 to 10 carbon atoms or cycloalkyl of 5 to 12 carbon atoms.

2. A process according to claim 1 wherein the metal oxide vulcanizing agent is magnesium oxide or zinc oxide.

3. A process according to claim 1 wherein the amount of the N-substituted carboxylic imide is from 0.2 to 1 part by weight per 100 parts by weight of polychloroprene polymer.

4. The process according to claim 2 wherein the vulcanization accelerator is N,N,N',N'-tetraalkyl-thiourea in which each alkyl group contains 1 to 5 carbon atoms.

5. The process according to claim 4 wherein the vulcanization accelerator is N,N,N',N'-tetramethyl-thiourea.

6. The process according to claim 4 wherein the N-substituted carboxylic imide is an N-alkylthio, N-cycloalkylthio, N-aralkylthio or N-arylthio derivative of maleimide, succinimide or phthalimide.

7. The process according to claim 6 wherein the N-substituted carboxylic imide is N-cyclohexylthiophthalimide.

8. A process for inhibiting the prevulcanization of a W-type polychloroprene rubber composition comprising vulcanizing agent consisting of a metal oxide and a vulcanization accelerator which is a thiourea derivative having the formula

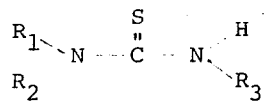

where (a) $R_1$ is a hydrogen atom or $R_1$ is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, and each of $R_2$ and $R_3$ is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, or (b) $R_1$ and $R_2$ together with the nitrogen atom to which they are attached form a saturated cyclic group of 4 to 10 carbon atoms and $R_3$ is the same as before, which comprises incorporating into the unvulcanized rubber, in addition to the vulcanizing agent and the vulcanization accelerator, an N-substituted carboxylic imide in which the N-substituent is a group —S—R where R is alkyl of 1 to 20 carbon atoms, aryl of 6 to 10 carbon atoms or cycloalkyl of 5 to 12 carbon atoms.

9. A process according to claim 8 wherein the metal oxide vulcanizing agent is magnesium oxide or zinc oxide.

10. A process according to claim 9 wherein the vulcanization accelerator is a trialkyl thiourea.

11. A process according to claim 10 wherein the vulcanization accelerator is a thiourea where each of $R_1$, $R_2$, and $R_3$ in the formula is an alkyl group containing 3, 4, or 5 carbon atoms.

12. A process according to claim 11 wherein the vulcanization accelerator is N,N,N'-tri-n-butylthiourea.

13. A process according to claim 11 wherein the N-substituted carboxylic imide is an N-alkylthio, N-cycloalkylthio, N-aralkylthio or N-arylthio derivative of maleimide, succinimide or phthalimide.

14. A process according to claim 13 wherein the N-substituted carboxylic imide is N-cyclohexylthiophthalimide.

15. A process according to claim 8 wherein the amount of the N-substituted carboxylic imide is from 0.2 to 1 part by weight per 100 parts by weight of polychloroprene polymer.

16. A vulcanizable composition comprising a W-type polychloroprene, a vulcanizing agent consisting of a metal oxide, a vulcanization accelerator which is a thiourea derivative having the formula

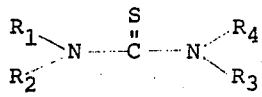

where (a) each of $R_1$ and $R_4$ independently is a hydrogen atom or is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, and each of $R_2$ and $R_3$ is alkyl, chloroalkyl or cyanoalkyl of 1 20 carbon atoms, alkenyl of 3 to 20 carbon atoms, cycloalkyl or alkylcycloalkyl of 5 to 10 carbon atoms, or aralkyl of 7 to 10 carbon atoms, or (b) $R_1$ and $R_2$ together with the nitrogen atom to which they are attached form a saturated cyclic group of 4 to 10 carbon atoms and $R_3$ and $R_4$ are the same as before, or (c) $R_1$ and $R_2$ together with the nitrogen atom to which they are attached form a saturated cyclic group of 4 to 10 carbon atoms and $R_3$ and $R_4$ together with the nitrogen atom to which they are attached form a saturated cyclic group of 4 to 10 carbon atoms, and an N-substituted carboxylic imide in which the N-substituent is a group —S—R where R is alkyl of 1 to 20 carbon atoms, aryl of 6 to 10 carbon atoms or cycloakyl of 5 to 12 carbon atoms.

17. A composition according to claim 16 wherein the vulcanizing agent is magnesium oxide or zinc oxide, the vulcanization accelerator is a tetraalkylthiourea, and the N-substituted carboxylic imide is an N-alkylthio, N-cycloalkylthio, N-aralkyl-thio or N-arylthio derivative of maleimide, succinimide or phthalimide.

18. A composition according to claim 17 wherein the vulcanization accelerator is N,N,N',N'-tetramethylthiourea and the N-substituted carboxylic imide is N-cyclohexylthiophthalimide.

19. A composition according to claim 16 that contains from 5 to 12 parts by weight of the vulcanizing agent, from 1 to 5 parts by weight of the vulcanization accelerator, and from 0.1 to 5 parts by weight of the N-substituted carboxylic imide, each per 100 parts by weight of polychloroprene polymer.

20. A vulcanizable composition comprising a W-type polychloroprene, a vulcanizing agent consisting of a metal oxide, a vulcanization accelerator which is a thiourea derivative having the formula

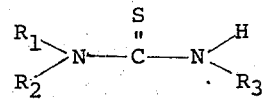

where (a) $R_1$ is a hydrogen atom or $R_1$ is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, and each of $R_2$ and $R_3$ is alkyl, chloroalkyl or cyanoalkyl of 1 to 20 carbon atoms, alkenyl of 3 to 20 carbon atoms, cycloalkyl or alkylcycloalkyl of 5 to 10 carbon atoms, or aralkyl of 7 to 10 carbon atoms, or (b) $R_1$ and $R_2$ together with the nitgroen atom to which they are attached form a saturated cyclic group of 4 to 10 carbon atoms and $R_3$ is the same as before, and an N-substituted carboxylic imide in which the N-substituent is a group —S—R where R is alkyl of 1 to 20 carbon atoms, aryl of 6 to 10 carbon atoms or cycloalkyl of 5 to 12 carbon atoms.

21. A composition according to claim 20 wherein the vulcanizing agent is magnesium oxide or zinc oxide, the vulcanization accelerator is a trialkylthiourea, and the N-substituted carboxylic imide is an N-alkylthio, N-cycloalkylthio, N-aralkyl-thio or N-arylthio derivative of maleimide, succinimide or phthalimide.

22. A composition according to claim 21 wherein the vulcanization accelerator is N,N,N'-tri-n-butylthiourea and the N-substituted carboxylic imide is N-cyclohexylthiophthalimide.

23. A composition according to claim 20 that contains from 5 to 12 parts by weight of the vulcanizing agent, from 1 to 5 parts by weight of the vulcanization accelerator, and from 0.1 to 5 parts by weight of the N-substituted carboxylic imide, each per 100 parts by weight of polychloroprene polymer.

* * * * *